United States Patent Office 3,556,556
Patented Jan. 19, 1971

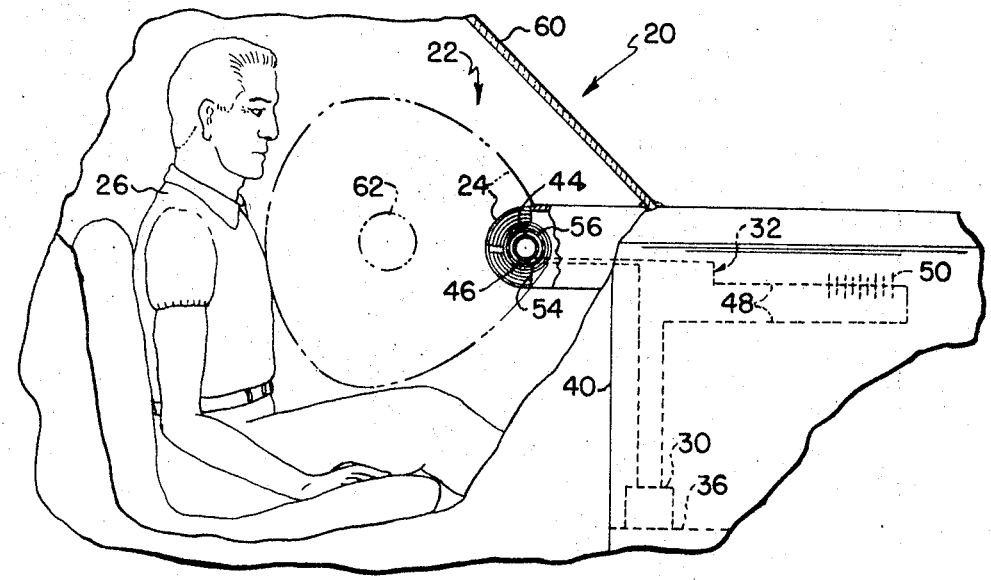
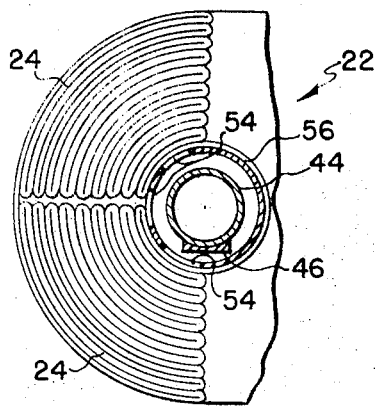
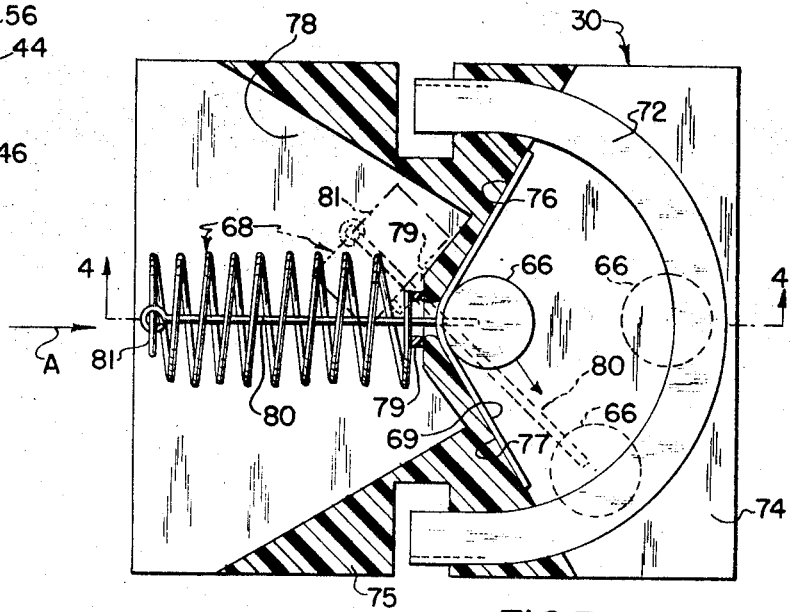
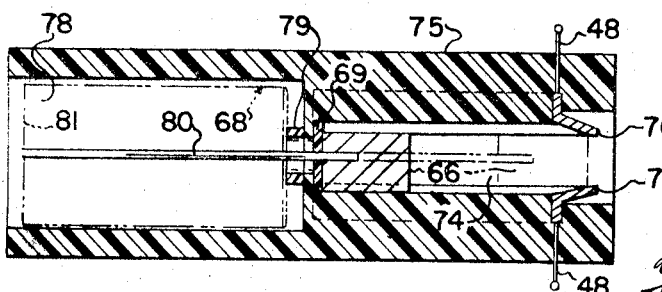

3,556,556
CRASH SENSOR
George W. Goetz, Detroit, Mich., assignor to Eaton Yale
& Towne Inc., Cleveland, Ohio, a corporation of Ohio
Filed Aug. 20, 1968, Ser. No. 753,947
Int. Cl. B60r 21/00
U.S. Cl. 280—150                              13 Claims

ABSTRACT OF THE DISCLOSURE

An improved sensor assembly for actuating a vehicle safety apparatus upon the occurrence of a collision includes a mass which is urged against an energy-absorbing stop by a coil spring with sufficient force to prevent movement of the mass to an actuated position due to vehicle braking and the encountering of non-collision driving conditions. The mass is movable in a plurality of directions with the direction of mass movement being dependent upon the direction of impact during the collision. When a collision occurs, the mass moves against the influence of the coil spring to the actuated position to complete a circuit for effecting actuation of the vehicle safety apparatus. The coil spring is associated with the mass so as to resist movement of the mass in any direction with the same biasing force.

---

This invention relates to a sensor assembly for actuating a safety device for protecting an occupant of a vehicle during a collision, and more particularly relates to a sensor assembly having a mass which is biased to an inactive position and which moves against the bias to an actuated position for actuating the safety device.

A known safety apparatus includes a confinement which is inflated to restrain movement of an occupant of a vehicle during a collision. Such a safety apparatus is shown in application, Ser. No. 562,289 (now Pat. No. 3,414,292), assigned to the asignee of the present invention. When an automotive vehicle with which this safety apparatus is associated is driven along a rough road or hits a hole in a road, the vehicle is subjected to an instantaneous deceleration or "g" force which may be of greater magnitude than the deceleration or "g" force encountered in certain collisions. Under such conditions, the inflation of the confinement would be unnecessary and undesirable. Inflation of the confinement under normal vehicle operating conditions would tend to startle occupants of the vehicle and might even impair to a limited extent the driver's ability to control the vehicle. Therefore, a sensor assembly for effecting inflation of the confinement upon the occurrence of a collision must be able to discriminate between deceleration due to a collision and deceleration caused by normal braking and road conditions. In addition, the sensor assembly must be constructed so as not to operate due to vibrations which may be induced by normal road conditions.

It has been found that the distinction between deceleration due to road conditions and deceleration due to a collision is not in the magnitude of the deceleration impulse on the vehicle, but rather on the duration thereof. For example, when a vehicle encounters a deep chuck hole in a road, the vehicle may be subjected to a high deceleration for a very short time interval. However, when the vehicle is involved in certain collisions the deceleration may never be as high as when the vehicle hits the chuck hole, but the duration of the deceleration will be much longer. Therefore, a sensor for actuating a safety device for protecting an occupant during a collision must be able to discriminate between the vehicle encountering a collision and encountering road conditions, and it has been discovered that to do so a sensor should be able to distinguish between high and low duration deceleration.

Moreover, different types of collisions result in the vehicle encountering different deceleration patterns. For example, in a head on or barrier type collision, the vehicle may encounter an instantaneous deceleration in excess of that encountered in the nature of a side swipe, the deceleration of the vehicle at any instant may be quite low but of a high duration. Accordingly a sensor for actuating a safety device must operate in both of these types of collisions.

While it is important that a collision sensor assembly be constructed in such a manner as to be responsive to a collision and nonresponsive to road conditions, it is also important that the sensor assembly operate to activate the safety apparatus at the proper instant during a collision. If the safety apparatus is activated too soon after the instant of impact, the confinement may be inflated and then at least partially deflated before the occupant begins to move forwardly relative to the vehicle due to the collision. Conversely, if the safety apparatus is activated too long after the instant of impact, the occupant may be injured by smashing against a part of the vehicle before the confinement is inflated to restrain his movement.

All of the above, has been discussed in copending application Ser. No. 753,946, filed Aug. 20, 1968, of George W. Goetz and Hermann Kaiser assigned to the assignee of the present application, and a sensor having the above advantages is claimed therein.

Moreover it is desirable that a sensor operate in the same manner in collisions of equal severity but having different directions of impact. Since the direction of impact for collisions will vary considerably, the sensor should operate of equal severity in approximately the same time even though the direction of impact differs. A sensor having such an operating characteristic is disclosed and claimed in Kaiser application Ser. No. 753,948, filed Aug. 20, 1968, assigned to the assignee of the present invention.

It is an object of this invention to provide a new and improved collision sensor for effecting actuation of a safety apparatus upon the occurrence of a collision and wherein the collision sensor is constructed to discriminate between deceleration due to a collision and deceleration due to road conditions, has a substantially uniform time for response to collisions within a wide range of impact directions, and is simple and reliable in construction.

Another object of this invention is the provision of a new and improved collision sensor for actuating a safety apparatus for protecting a vehicle occupant during a collision and which is insensitive to high frequency deceleration, which may result from road conditions, and is also insensitive to low magnitude vehicle deceleration as occurs during vehicle braking and which includes a coil spring which biases a mass to an initial position and the mass moves in a direction away from the spring when the mass moves to an actuated position.

Another object of this invention is to provide a new and improved collision sensor assembly including a mass which is movable in a plurality of directions against the influence of a coil spring, and wherein the spring exerts a substantially constant biasing force on the mass as the mass moves in all of the directions.

These and other objects and features of the present invention will become more apparent upon a consideration of the following description of a preferred embodiment of the present invention taken in connection with the accompanying drawing wherein:

FIG. 1 is a schematic illustration showing a safety apparatus constructed in accordance with the present invention and associated with an automotive vehicle;

FIG. 2 is a schematic illustration on an enlarged scale, of the safety apparatus of FIG. 1 in a collapsed or inoperative condition;

FIG. 3 is a schematic illustration of a sensor assembly for detecting the occurrence of a collision and effecting actuation of the safety apparatus from the collapsed condition of FIG. 2 to the expanded condition, shown in dashed lines in FIG. 1, upon the occurrence of a collision; and FIG. 4 is a schematic illustration, taken along the lines 4—4 of FIG. 3, further illustrating the structure of the sensor assembly.

The present invention provides a collision sensor assembly for detecting the occurrence of a collision and effecting actuation of a vehicle safety apparatus to an operated condition to protect an occupant of the vehicle. The collision sensor assembly is operated in response to forces resulting from the vehicle encountering a collision. The sensor is capable of distinguishing a collision from vehicle braking, normal road conditions, and minor vehicle impacts which will not cause injury to the occupants of the vehicle. The sensor assembly is nonresponsive to the relatively large instantaneous deceleration caused by certain road conditions, even though the magnitude of the instantaneous deceleration may exceed the deceleration at any instant during a collision. To these ends, the collision sensor assembly includes a mass which is biased to an inactive position and moves therefrom during a collision in much the same manner as the occupant of the vehicle moves relative thereto to effect activation of the safety apparatus immediately before the occupant begins to move relative to the vehicle. Although the vehicle safety apparatus and collision sensor assembly are illustrated in the drawing in particular locations on an automotive vehicle, it is contemplated that the safety apparatus and collision sensor assembly could be mounted in other locations. A sensor having the above noted advantages is described and claimed in copending application, Ser. No. 753,946 filed Aug. 20, 1968 in the name of Goetz and Kaiser.

Referring to FIG. 1, an automotive vehicle 20 is illustrated schematically and includes a safety apparatus 22. The safety apparatus 22 includes a confinement 24 which is inflated, from a collapsed condition, shown in solid lines in FIG. 1, to an expanded condition, shown in dashed lines in FIG. 1, to restrain movement of an occupant 26 of the vehicle during a collision. A collision sensor assembly 30 is connected with the safety apparatus 22 by electrical circuitry 32 and is operative to detect the occurrence of a collision and effect activation of the safety apparatus 22 from the inoperative position to the operative position. In the present embodiment of the invention, the sensor assembly 30 is mounted on a cross frame member 36 of the vehicle 20. However, it is contemplated that the sensor assembly 30 could, if desired, be mounted on a fire wall 40 or other part of the vehicle 20.

The construction of the safety apparatus 22 is further illustrated in FIG. 2 and includes a fluid supply, in the present instance a reservoir 44 containing fluid under pressure. An explosive charge 46 is associated with the reservoir 44 for forming an opening in the reservoir 44 to enable the fluid to escape therefrom upon the occurrence of a collision. The explosive charge 46 is detonated or activated by operation of the collision sensor assembly 30 upon the occurrence of a collision. Operation of the sensor assembly 30 completes a circuit through wires 48 of the circuitry 32 to conduct current from a source of power, such as a battery 50, to the explosive charge 46 to effect activation of the explosive charge in a known manner.

Upon activation of the explosive charge 46 and the formation of an opening in the fluid reservoir 44, fluid flows through the opening in the reservoir and slots 54 in a diffuser 56 to inflate the confinement 24 from the collapsed condition, shown in FIG. 2, to the expanded condition, shown in dashed lines in FIG. 1. The confinement 24, in the expanded condition, restrains forward movement of the occupant 26 to prevent him from engaging the windshield 60 or other parts of the vehicle 20 under the influence of collision forces. A pressure responsive blow-out assembly 62, of known construction, is provided for forming an aperture in the confinement to minimize rebound of the occupant 26 by enabling fluid to escape from the confinement. This flow of fluid results in the confinement 24 being deflated shortly after the occurrence of the collision.

The collision sensor assembly 30 includes a disc or mass 66 (see FIGS. 3 and 4) which is movable against the influence of a biasing spring 68 from an initial position or condition, shown in solid lines, to an actuated position or condition, shown in dashed lines, under the influence of collision forces. In the initial position, the mass 66 is held against a stop strip or member 69 by the spring 68 with a predetermined biasing force which must be overcome before the mass moves to the actuated position. In the actuated position (shown in dashed lines in FIG. 4), the mass 66 is wedged between a pair of arcuate resilient contact strips 70, 72 which are associated with respective ones of the wires 48. This wedging engagement of the mass 66 with the resilient contact strips 70, 72 ensures completion of an electrical circuit to activate the explosive charge 46 (see FIG. 2).

The mass 66 is located in a slot or chamber 74 formed in a housing 75 having angularly related guide or side walls 76, 77. A suitable cover, not shown, may be provided for the housing 75. In the illustrated embodiment, the walls 76, 77 intersect at an inclined angle of 120°, i.e., 60° on opposite sides of the forward direction of the vehicle 20 indicated by arrow A FIG. 3. This limits the sideward and rearward movement of the mass 66. Therefore, the mass 66 is subject to movement from the initial position to the actuated position due to collisions which result in forces providing for relative movement of the housing 75 and mass 66 within the included angle between the walls 76, 77. Such collisions, in general, would be collisions where the direction of impact is within the included angle between the walls 76, 77. In a collision where the mass 66 tends to move in a sideward or rearward direction relative to the housing 75, one of the walls 76, 77 of the housing 75 prevents such movement. Of course, an included angle of more or less than 120° could be provided between the side walls 76, 77.

When a vehicle having the sensor 30 becomes involved in a collision, the vehicle decelerates. The deceleration is not at a constant magnitude, but on the contrary, varies. Moreover, as parts of the vehicle crush during the initial stages of a collision, the vehicle could accelerate. The housing 75 of the sensor is attached to a part of the vehicle which decelerates and, possibly, accelerates after impact of the vehicle with an obstruction. The mass 66 being free to move relative to the housing 75 tends to move relative thereto due to the momentum of the mass 66, and moves relative thereto upon overcoming the bias of the spring 68.

In the event of a collision resulting in forces having both forward and sideward components, the spring 68 is movable within a chamber 78 of the housing 75 to maintain a straight line between the mass 66 and the centerline of the spring 68. This ability of the spring to move and maintain a straight line between the mass 66 and the centerline of the spring 68 results in substantially the same biasing force being applied to the mass 66 when it moves in a forwardly and sidewardly direction as when the mass 66 moves in a straight forward direction. To provide for this movement of the spring 68, the spring 68 is held against a guide 79 by a link 80 which extends from an end 81 of the spring 68 into the chamber 74 through apertures in the guide 79, housing 75, and stop member 69. The link 80 is fixedly connected to the mass 66. When the mass 66 tends to move forwardly under the influence of collision forces, the link pulls the spring 68 against the guide 79 to compress the spring 68 and thereby enables the mass to move forwardly toward the contact strips 70, 72. If the mass moves at an angle to the link 80, as indicated by the arrow in FIG. 3, the spring 68 is rotated by the action of the mass 66 on the link 80 to keep a straight line between the centerline of the spring and the mass, such as shown in dotted lines in FIG. 3.

Upon the occurrence of a head-on collision, which is likely to injure the occupant 26 of the vehicle 20, the mass 66 moves forwardly relative to the housing 75 upon overcoming the biasing effect of the spring 68. The bias of the spring will be overcome only when the deceleration of the housing 75 is sufficiently high for a sufficient time interval. However, if the vehicle 20 encounters conditions where the deceleration of the housing 75 is relatively small or of insufficient duration to overcome the biasing effect of the spring 68, the mass 66 will not move sufficiently to actuate the safety apparatus 22.

During many minor or low speed collisions or impacts, the collision forces are insufficient to cause injury to an occupant of a vehicle and the safety apparatus 22 need not be operated. Thus, when the vehicle 20 collides with a rigid barrier at a low speed, the collision forces can be readily resisted by the occupant 26 and the average force on the mass 66 is incapable of moving the mass to the actuated position against the influence of the biasing spring 68. Therefore, the mass 66 is not moved through a sufficient distance to engage the contact strips 70, 72 and the safety apparatus 22 remains in the inoperative condition shown in solid lines in FIG. 1.

Displacement of the mass 66 increases substantially with increase in the speed at which the vehicle collides with a barrier. At a predetermined speed, the collision could cause injury to the occupant 26 of the vehicle 20 and the mass 66 moves to the actuated position. This actuation of the collision sensor 30 results in the safety apparatus being operated to protect the occupant 26 of the vehicle 20 during the collision. Thus, the sensor assembly 30 is not actuated by relatively low impact forces resulting from a minor bumping of the vehicle against a barrier since the collision forces are insufficient to cause injury to the occupant 26. However, as the speed of the vehicle increases, the forces resulting from the impact of the vehicle against the barrier increase and at a predetermined speed, the sensor assembly 30 is actuated to effect operation of the safety apparatus 22 to protect the occupant 26 against the relatively large forces of a collision.

When the vehicle 20 engages a rigid post at low speed, the forces are relatively easily resisted by an occupant of the vehicle and are insufficient to cause the mass 66 to move against the influence of the spring 68 to the actuated position. The forces resulting from an impact of a vehicle against a rigid post are usually smaller at any given speed than the collision forces resulting from an impact of the vehicle against a barrier at the same speed. Thus, the speed at which a collision with a post actuates the sensor assembly 30 is higher than the speed at which the sensor assembly is actuated by a collision with a barrier.

When the vehicle 20 is being driven along a road, it may encounter "chuck holes" or dips and ridges in the road which can subject the vehicle to high instantaneous deceleration. However, the deceleration is at a high frequency, and thus the duration of the deceleration is insufficient to result in injury to the occupant 26 of the vehicle 20. The biasing effect of the spring 68 is such as to retain the mass 66 against movement to the actuated position due to such instantaneous high frequency deceleration. Moreover, the biasing effect of the spring 68 is also such as to retain the mass against movement due to vehicle deceleration as a result of braking. Accordingly, the mass 66 moves through a relatively small distance, when the vehicle 20 is braked or encounters certain road conditions.

When the vehicle 20 encounters particularly severe road conditions, the vehicle is subjected to impact forces which may, for an instant, be in excess of the impact forces encountered in many collisions. The resultant vehicle deceleration is of relatively large magnitude and would cause the mass 66 to move to the actuated position, if maintained for a substantial period of time. However, these large impact forces are instantaneous in nature and of insufficient duration to effect movement of the mass 66 from the initial position to the actuated position. Thus, even when the vehicle 20 encounters extremely severe road conditions resulting in high instantaneous deceleration, the sensor assembly 30 is not actuated. This is because the high deceleration is of insufficient duration, (i.e., high frequency) to overcome the biasing effect of the spring 68 to cause the mass 66 to move from the initial position to the actuated position.

As time elapses from the instant of a collision, the vehicle continues to be decelerated and the time span over which the deceleration forces are applied to the housing 75 increases until the influence of the biasing spring 68 is overcome. The mass 66 then moves away from the stop member or strip 69 toward the actuated position. At a point of time the mass 66 reaches the actuated position. The mass 66 then completes the electrical circuit between the contacts 70, 72 to effect an activation of the explosive charge 46 and an inflation of the confinement 24 by a flow of fluid from the reservoir 44.

It has been noted that the chest acceleration of the occupant 26 is still substantially zero when the mass 66 moves into the actuated position. A relatively short time thereafter, the chest of the occupant 26 accelerates relative to the vehicle. Thus, it can be seen that the movement of the mass 66 under the influence of collision forces is similar or analogous to the movement of the chest of the occupant 26, with the movement of the mass 66 being slightly ahead of the movement of the chest of the occupant 26. This movement of the mass, ahead of the chest of the occupant is due to the particular location of the sensor in the vehicle.

It has been found that a biasing force of between 2 and 16 times the weight of the mass 66 results in response characteristics similar to that of the occupant 26. The biasing force of the spring 68 also serves to hold the mass in the initial position so that it is not affected by relatively large instantaneous forces. A biasing force in this range prevents sensor actuation when the vehicle 20 is braked or encounters severe road coditions to thereby prevent unwanted actuation of the safety apparatus 22.

Actuation of the sensor assembly 30 causes the confinement 24 to be rapidly inflated to the operative or expanded condition shown in dashed lines in FIG. 1. The operation of the blow-out assembly 62 results in a deflation and collapsing of the confinement 24 a short time after it is inflated to the expanded condition to minimize rebound of the occupant 26 relative to the confinement. Thus, it is important that the mass 66 moves in a manner which is analogous to the movement of the occupant 26 so that the mass 66 moves to the actuated position just before the occupant 26 begins to move forwardly. If the mass responds too quickly to the collision forces and the confinement is inflated too soon, the confinement may be deflated before the occupant 26 begins his forward movement. The safety apparatus 22 is then ineffective to protect the occupant. Of course, if the mass 66 responds too slowly and the confinement is inflated too late, the occupant 26 may be injured by engagement with the vehicle before the confinement is inflated.

It has been found that a proper relationship of the mass, spring, and distance of movement of the mass are necessary to provide the sensor 30 which is capable of distinguishing between the various road conditions encountered by a vehicle and a collision, as disclosed in copending Goetz and Kaiser application, Ser. No. 753,946 filed Aug. 20, 1968. The mass 66 moves through a distance of between 0.1 of an inch and 1.0 inch between the initial position and the actuated position. The spring 68 exerts a substantially constant biasing force against the mass 66, with the biasing force being at some predetermined value between 2 and 16 times the weight of the mass. If the distance through which the mass is moved from the initial position to the actuated position is less than 0.1 of an inch, the mass may be displaced to the actuated condition by severe road conditions causing an instantaneous low duration high deceleration, even though the vehicle 20 has not encountered a collision. If the distance through which the mass 66 is displaced from the initial position to the actuated position is more than 1.0 inch, the time required for the mass to travel the distance will be too great and the safety apparatus 22 will be actuated late. Moreover, if the biasing force of the spring against the mass is low, the mass may move under the influence of vibrations resulting from road conditions or braking.

In addition to the influence of the spring 68, the mass 66 is prevented from moving toward the actuated position under the influence of vibrations from the road conditions by forming the stop member or strip 69 of an energy-absorbing material having a coefficient of restitution which is less than .9 and preferably less than 0.3. If the stop member 69 was formed of a material having a relatively high coefficient of restitution, for example, a coefficient of restitution in excess of 0.9, the rebound of the mass from the stop member 69 and vibration of the mass relative to the stop member could result in the mass being moved to the actuated position, even though the vehicle did not encounter a collision. Of course, if the housing 75 was made of a material having a reatively low coefficient of restitution, the stop member 69 would be effectively built into the housing and the stop member 69 could be eliminated as a separate element of the sensor assembly.

A substantially uniform displacement of the mass 66 toward the actuated position under the influence of collision forces is achieved by the action of the biasing spring 68 which exerts a substantially constant biasing force against the mass. To provide this substantially constant biasing force, the spring 68 is compressed from a free length which is at least four times greater than the length of the spring when the mass 66 is in the initial position shown in FIG. 3. Thus, in one illustrative embodiment of the invention, the spring 68 has a free length of approximately 5.6 inches and is compressed to a length of 0.7 inch by engagement with the guide 79 when the mass 66 is in the initial position. This illustrative spring 68 is compressed to a length of 0.2 inch by movement of the mass 66 through a distance of approximately 0.5 inch from the initial position to the actuated position. Of course, the foregoing dimensions of the spring 68 are merely illustrative and are not to be considered as limiting the scope of the invention to a spring having these dimensions.

In view of the foregoing, it can be seen that the collision sensor assembly 30 has a mass 66 which moves to an actuated position to effect actuation of the safety apparatus 22. The mass 66 is held against the energy-absorbing stop 69 by the biasing spring 68 which is preloaded to prevent the mass from moving to the actuated position under the influence of forces and vibrations resulting from normal road and braking conditions. The mass 66 moves from the initial position to the actuated position against the influence of the spring 68 as a function of the duration and magnitude of the average deceleration of the housing 75 over the elapsed time interval from the occurrence of the collision. Therefore, the mass 66 is nonresponsive to relatively high deceleration of short duration (i.e., high frequency), which occurs as a result of severe road conditions. Of course, if the vehicle 20 was subjected to an impact force of a magnitude equal to the magnitude of the collision forces associated with the peak deceleration 122 for a relatively long period of time, such as by crashing the vehicle into a barrier, the mass 66 would be moved to the actuated position to effect operation of the safety apparatus 22 to protect the occupant 26.

Since the mass 66 moves relative to the housing 75 in different types of collisions in much the same manner as the occupant 26 moves relative to the vehicle, the sensor assembly 30 is effective to initiate operation of the safety apparatus 22 at the proper time during a collision. Upon the occurrence of any type of collision resulting in the application of forces of sufficient magnitude and duration in the forward direction, the mass 66 moves forwardly relative to the housing 75 to complete a circuit and effect inflation of the confinement 24 immediately before the occupant 26 begins to move forwardly under the influence of the collision forces. This ensures that the confinement is inflated in time to protect the occupant and ensures that the confinement 24 is not deflated before the effect of the collision forces on the occupant 26 are at least partially overcome by penetration or engagement of the occupant 26 with the confinement. Of course, the sensor assembly 30 and safety apparatus 22 could, if desired, be located in orientations other than the one illustrated herein to protect an occupant of a vehicle against collision forces tending to move him in a direction other than the forward direction.

Having described my invention, I claim:

1. Apparatus comprising a housing adapted to be secured to a part which is subjected to deceleration, a mass supported by said housing and movable relative thereto in any one of a plurality of directions from an initial position to one of a plurality of actuated positions, biasing means for urging said mass to said initial position and restraining said mass against movement to the actuated positions during deceleration of said housing, and means interconnecting said biasing means and said mass providing for shifting of said entire biasing means relative to said housing to resist movement of said mass in any of said plurality of directions to any one of said plurality of actuated positions with the same biasing force.

2. Apparatus as set forth in claim 1 wherein said biasing means comprises coil spring means acting between said housing and said mass, said coil spring means having an end portion which presses against said housing and is movable relative to said housing upon shifting of said biasing means relative to said housing to provide for substantially uniform compression of said coil spring means upon movement of said mass to any one of the plurality of actuated positions.

3. Apparatus as set forth in claim 1 wherein said biasing means comprises spring means movably mounted to apply said biasing force to said mass in a direction opposite the direction of relative movement of the mass and housing for all directions of movement of said mass relative to said housing, and shiftable in response to movement of said mass in a given direction.

4. Apparatus as set forth in claim 1 wherein said biasing means comprises a coil spring and further including a connecting link lying on the axis of said coil spring when said mass is in said initial position and connected with said coil spring and said mass, said connecting link acting to shift the coil spring so that the axis thereof extends in the direction of movement of the mass if the axis of the spring and direction of movement of the mass do not coincide.

5. Apparatus as set forth in claim 1 wherein said mass is movable in said plurality of directions in a recess in said housing having opposed sides located at an obtuse angle with respect to each other.

6. Apparatus for use in actuating a safety device on a vehicle to protect an occupant of the vehicle during a collision, said apparatus comprising a housing adapted to be secured to a part of the vehicle which is subjected to deceleration during a collision, said housing defining a recess having opposing sides located at an obtuse angle to each other, a mass supported by said housing and movable relative thereto through a predetermined distance from an initial position to an actuated position upon the occurrence of a collision, means for actuating the safety device upon movement of said mass relative to said housing to said actuated position, said means for actuating the safety device including a pair of arcuate spaced apart contact strips extending between said opposing sides of said housing, said mass in said actuated position being located in engagement with said contact strips to thereby complete a circuit for effecting actuation of the safety apparatus, and biasing means urging said mass to said initial position and retaining said mass against movement to said actuated position during deceleration of said housing due to vehicle braking and during acceleration of said housing due to vibration thereof resulting from road conditions, said biasing means comprising coil spring means acting between said housing and said mass, said mass being movable in a direction away from said coil spring means to said actuated position.

7. Apparatus for use in actuating a safety device on a vehicle to protect an occupant of the vehicle during a collision, said apparatus comprising a housing adapted to be secured to a part of the vehicle which is subjected to deceleration during a collision, a mass supported by said housing and movable relative thereto in a plurality of directions through a predetermined distance from an initial position to an actuated position upon the occurrence of a collision, means for actuating the safety device upon movement of said mass relative to said housing to said actuated position, and biasing means urging said mass to said initial position and retaining said mass against movement to said actuated position during deceleration of said housing due to vehicle braking and during acceleration of said housing due to vibration thereof resulting from road conditions, said biasing means comprising coil spring means acting between said housing and said mass, said mass moving in a direction away from said coil spring means to said actuated position and said coil spring means being bodily movable relative to said housing to resist movement of said mass in any of said plurality of directions with substantially the same biasing force.

8. Apparatus as set forth in claim 7 wherein said coil spring means is movably mounted to apply said biasing force to said mass in a direction opposite the direction of relative movement of the mass and housing for all directions of movement of said mass relative to said housing, and is movable bodily in response to movement of said mass in a given direction.

9. Apparatus as set forth in claim 8 wherein said biasing means further includes a connecting link lying on the axis of said coil spring means when said mass is in said initial position and connected with said coil spring means and said mass, said connecting link acting to shift the coil spring means so that the axis thereof extends in the direction of movement of the mass if the axis of the spring means and direction of movement of the mass do not coincide.

10. Apparatus for use in a vehicle to activate a safety device during a collision wherein the direction of impact is within a predetermined range of directions to thereby protect an occupant of the vehicle, said apparatus comprising a housing adapted to be secured to a part of the vehicle subjected to deceleration during a collision, said housing including wall means having first and second sections extending relative to each other at an obtuse angle which at least partially includes the predetermined range of directions of impact in a collision in which said apparatus is operable to activate the safety device, a mass supported by said housing and movable relative thereto in any one of a plurality of directions included within the obtuse angle between said first and second sections of said wall means from an initial position in which said mass engages said wall means to an actuated position upon occurrence of a collision, means for activating the safety device upon movement of the mass relative to said housing to an actuated position, and spring means for urging said mass toward said initial position in which said mass engages said wall means to retain said mass against movement to an actuated position during deceleration of said housing due to vehicle braking and road conditions, said mass being movable from the initial position against the influence of said spring means to an actuated position upon the occurrence of a collision wherein the direction of impact is within the predetermined range of directions of impact to thereby effect activation of the safety device to protect an occupant of the vehicle, said first and second sections of said wall means supporting said mass against movement to an actuated position upon the occurrence of a collision wherein the direction of impact is outside the predetermined range of directions of impact.

11. Apparatus as set forth in claim 10 wherein said spring means is operable to resist movement of said mass to an actuated position in any one of the plurality of directions with the same biasing force.

12. Apparatus as set forth in claim 10 wherein said mass is movable against the influence of said spring means from the initial position along a first path extending parallel to said first section of said wall means to a first actuated position, said mass being movable against the influence of said spring means from the initial position along a second path extending parallel to said second section of said wall means to a second actuated position, said first and second paths extending at the same obtuse angle relative to each other as which said first and second sections of said wall means extend relative to each other.

13. Apparatus as set forth in claim 12 wherein said spring means is operable to urge said mass from said first actuated position toward said initial position with a biasing force which is equal in magnitude to the biasing force with which said spring means is operable to urge said mass from said second actuated position toward said initial position.

References Cited

UNITED STATES PATENTS

| | | | |
|---|---|---|---|
| 2,850,291 | 9/1958 | Ziccardi | 280—150 |
| 2,921,999 | 1/1960 | Ziegler | 200—61.52 |
| 2,997,558 | 8/1961 | Shindledecker et al. | 200—61.48 |
| 3,089,007 | 5/1963 | Rovin | 200—61.48 |
| 3,336,045 | 8/1967 | Kobori | 280—150 |
| 3,414,292 | 12/1968 | Oldberg et al. | 280—150 |

KENNETH H. BETTS, Primary Examiner

U.S. Cl. X.R.

180—103; 200—61.45